(12) United States Patent
Sugurappa Angadi et al.

(10) Patent No.: US 8,089,346 B2
(45) Date of Patent: Jan. 3, 2012

(54) SYSTEM AND METHOD FOR MANAGING RESTAURANT CUSTOMERS AND PLACING ORDERS

(76) Inventors: Girish Sugurappa Angadi, Bangalore (IN); Nisar Ahmed, Bangalore (IN)

( * ) Notice: Subject to any disclaimer, the term of this patent is extended or adjusted under 35 U.S.C. 154(b) by 377 days.

(21) Appl. No.: 12/306,931

(22) PCT Filed: Jun. 18, 2007

(86) PCT No.: PCT/IN2007/000245
§ 371 (c)(1),
(2), (4) Date: Jan. 9, 2009

(87) PCT Pub. No.: WO2008/001390
PCT Pub. Date: Jan. 3, 2008

(65) Prior Publication Data
US 2009/0237224 A1    Sep. 24, 2009

(30) Foreign Application Priority Data
Jun. 28, 2006    (IN) .......................... 1096/CHE/2006

(51) Int. Cl.
*G08B 5/36* (2006.01)
(52) U.S. Cl. ................................ 340/286.09; 340/573.1
(58) Field of Classification Search ............. 340/286.09, 340/286.11, 286.12, 286.07, 286.08, 573.1
See application file for complete search history.

(56) References Cited

U.S. PATENT DOCUMENTS

| | | | |
|---|---|---|---|
| 6,646,659 B1 * | 11/2003 | Brown et al. ................. | 715/811 |
| 6,982,733 B1 * | 1/2006 | McNally et al. .............. | 715/810 |
| 2001/0054066 A1 * | 12/2001 | Spitzer .......................... | 709/203 |
| 2002/0124257 A1 * | 9/2002 | Ismagilov ...................... | 725/60 |
| 2002/0133418 A1 * | 9/2002 | Hammond et al. ............. | 705/26 |
| 2002/0138350 A1 * | 9/2002 | Cogen ............................ | 705/15 |
| 2003/0154131 A1 | 8/2003 | Tsang | |

FOREIGN PATENT DOCUMENTS

| | | |
|---|---|---|
| GB | 2407883 | 5/2005 |
| WO | 03067369 | 5/2003 |

OTHER PUBLICATIONS

International Search Report for PCT/IN2007/000245 dated Dec. 12, 2007.

* cited by examiner

*Primary Examiner* — Daniel Previl
(74) *Attorney, Agent, or Firm* — Lowe Hauptman Ham & Berner, LLP (57) ABSTRACT

A system and method is provided to facilitate the owners of the restaurants in managing their restaurant business and facilitate customers of the restaurants in at least placing orders. The system comprises a local server, plurality of hand held devices and an internet based application. The local server is associated with a restaurant. The restaurant has a plurality of hand held devices, the hand held devices facilitating a customer of the restaurant to place an orders in the restaurant by comunicating with the local server. The internet based application is deployed on a sever; the internet based application sends data to the local server and recieves data from the local server.

26 Claims, 9 Drawing Sheets

Welcome XYZ

| Items | Describ | Order | Quantity | Pric |
|-------|---------|-------|----------|------|
| Burge | ☐ | ✓ | 2 | 10 |
| Pizz | ☐ | ✓ | 1 | 1 |
| Brea | ☐ | ☐ | ☐ | 0 |

Submit order    View order

Arrange items in the order of style

Arrange items in the order of

SYSTEM AND METHOD FOR MANAGING RESTAURANT CUSTOMERS AND PLACING ORDERS

CROSS REFERENCE TO RELATED APPLICATION

This application claims the priority of Indian Patent Application No. 1096/CHE/2006, filed on Jun. 28, 2006 in the IPO (Indian Patent Office), the disclosure of which is incorporated herein in its entirety by reference. Further, this application is the National Phase application of International Application No. PCT/IN2007/000245, filed Jun. 18, 2007, which designates the United States and was published in English, the entirety of which is incorporated herein by reference.

FIELD OF THE INVENTION

The present invention relates to the field of ordering systems in restaurants. More particularly, the present invention relates to managing restaurants and automating business process in the restaurant industry.

BACKGROUND AND PRIOR ART

In this competitive world of business, it is necessary that companies optimize their business process to be efficient and satisfy their customers. Hence, companies are trying to cut down overheads by automating various steps in their business process. Effort to streamline the business process is being made across various industry verticals, service industry being one among them. The hotel industry is one of the service industries wherein, in addition to process streamlining, customer satisfaction is of utmost importance.

Generally, in a restaurant business, when a customer walks in to restaurant, he is provided with a table if it is available, else he will be asked to wait in the waiting room till a table is made available. The customer after being given a table may have to wait for a waiter to come to him so that an order can be placed. Alternatively, if a customer after being given a table might be waiting for another person to join him, and may get annoyed if a waiter keeps coming to him to take the order. However, if the customer is in a hurry, he might prefer to order for food while he is in the waiting room. If a customer is a frequent visitor of the restaurant and likes a set of items in the restaurant, to order the same, he will have to browse through the menu to recollect the names of his favorite dishes. Additionally, a customer while ordering for a dish may wish to read a brief description of the dish and may also wish to see how the dish would look like.

Customer loyalty is maintained by providing various offers to customers who visit the restaurant regularly. However, maintaining a list of frequently visiting customers is a tedious process which requires human intervention in collecting and collating the data. As the restaurant business grows, branches of restaurants are opened at different locations. When the restaurant decides to change their menu or the prices of the dishes, the restaurants will have to get a new menu printed, which requires investment of time and money.

In light of the foregoing discussion, there is a need for a system which facilitates a customer of a restaurant to order for dishes without having to wait for the waiter. Additionally, the customer should be able to check the availability of a table and book the same before coming to the restaurant. The customer should be able to read about the dish which he desires to order and he should also be able to see images of dish before ordering the dish. The system should be able to recognize the customer when he starts to use the system. The system should be able to provide a list of favorite dishes of the customer if the customer is a frequent visitor of the restaurant. The system should also facilitate in making changes in the restaurants' menu.

SUMMARY OF THE INVENTION

An object of the present invention is to provide a system that facilitates a customer of a restaurant to order for dishes without having to wait for the waiter.

Another object of the present invention is to provide a system that facilitates the customer to check the availability of a table and book the same before coming to the restaurant.

Yet another object of the present invention is to provide a system that facilitates customer to read a description about the dish which he desires to order and he should also be able to see images of dish before ordering the dish.

Still another object of the present invention is to provide a system that gives a list of his favorite dishes if the customer is a frequent visitor of the restaurant.

Yet another object of the present invention is to provide a system that helps restaurants in effective management of change in menu.

In one aspect of the present invention, a system for managing restaurants is provided. The system facilitates the owners of the restaurants in managing their restaurant business and facilitates customers of the restaurants in at least placing orders. The system comprises a local server associated with a restaurant, hand held devices associated with the local server that facilitates a customer of the restaurant to place orders in the restaurant. The system further comprises an internet based application, the internet based application runs on a server and is capable of sending data to the local server and receiving data from the local server. The handheld device comprises a graphic user interface, a key pad, a magnetic card reader, and a transceiver. The graphic user interface is capable of displaying at least one of text, image and video. The key pad is an alphanumeric key pad that facilitates the customer to enter alphanumeric values. The handheld device further comprises a magnetic card reader that facilitates the customer to make payment using their magnetic card.

In another aspect of the present invention, a method for managing restaurants using the system is provided. The method facilitates the owners of the restaurants in managing their restaurant business and facilitates customers of the restaurants in at least placing orders. The method comprising the steps of transmitting menu of a restaurant to local server of the restaurant, wherein the menu is sent from the local server running the internet based application. Later the menu is transmitted from the local server to the handheld device. The customer may access the menu in the handheld device and place an order by providing inputs to the handheld device.

BRIEF DESCRIPTION OF DRAWINGS

The above aspects of the invention are described in detail with reference to the attached drawings, where.

DETAILED DESCRIPTION OF THE INVENTION

Figure 1:
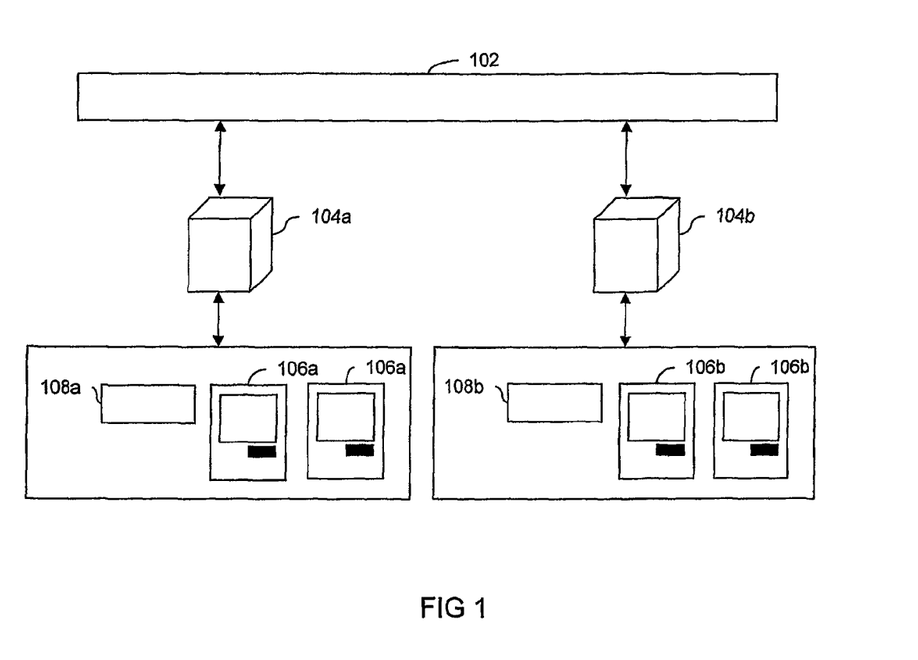
FIG. 1 is a diagram of a system for managing a restaurant, in accordance with various embodiments of the present invention.

FIG. 1 is a diagram of a system for managing a restaurant, in accordance with various embodiments of the present invention. The system comprises an Internet Based Application (IBA) 102, local servers 104a and 104b, handheld devices 106a and 106b, and administration devices 108a and 108b. The Internet based application 102 is deployed over a server and it helps restaurants manage their business process and also helps restaurants attain a higher degree of customer satisfaction. The IBA 102 provides login for restaurant owners. Additionally, the IBA 102 facilitates restaurant owners with more than one branch to optimizing their operation. Each restaurant that uses the IBA 102 has a local server 104 that is connected to the server over which the IBA 102 is deployed.

In an embodiment of the present invention a first restaurant's outlet may be associated with a local server 104a which is in turn is connected the server over which the IBA 102 is deployed. The outlet has a plurality of handheld devices 106a. The handheld devices 106a are connected to the local server 104a through wireless means. In an embodiment of the present invention, if the restaurant has multiple outlets, each outlet will have its own local server, and a set of handheld devices associated with the local server, and the local server will be connected to the server over which the IBA 102 is deployed. Similarly, a second restaurant's outlet may be associated with a local server 104b which is in turn is connected to the server over which the IBA 102 is deployed. The handheld devices 106b are connected to the local server 104b through wireless means. The handheld devices 106a and 106b are capable of sending and receiving data to and from the local servers 104a and 104b respectively. In an embodiment of the present invention, the local server is located in the restaurant with which it is associated.

Figure 2:
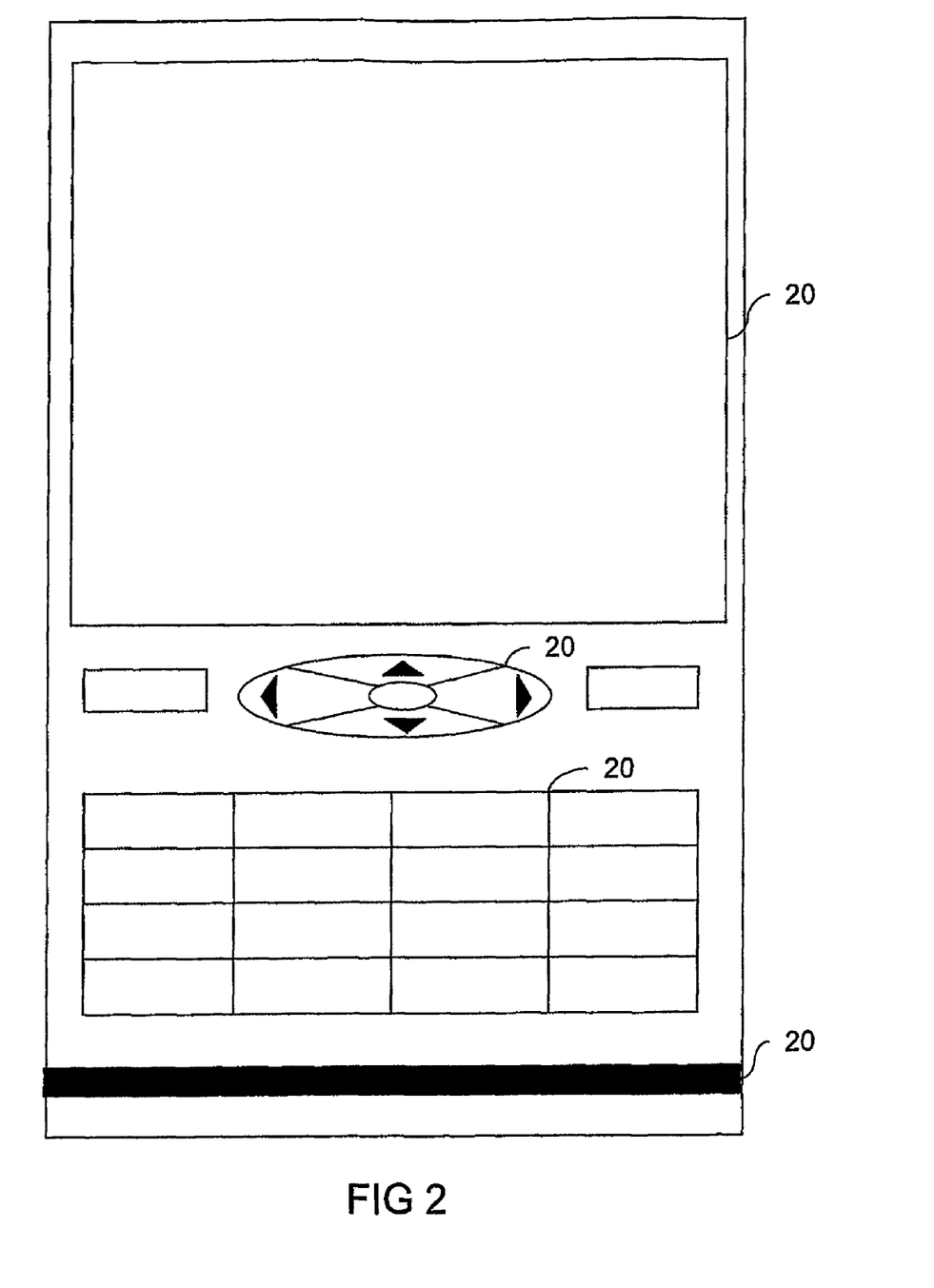
FIG. 2 illustrates a handheld device, in accordance with various embodiments of the present invention.
Figure 3:
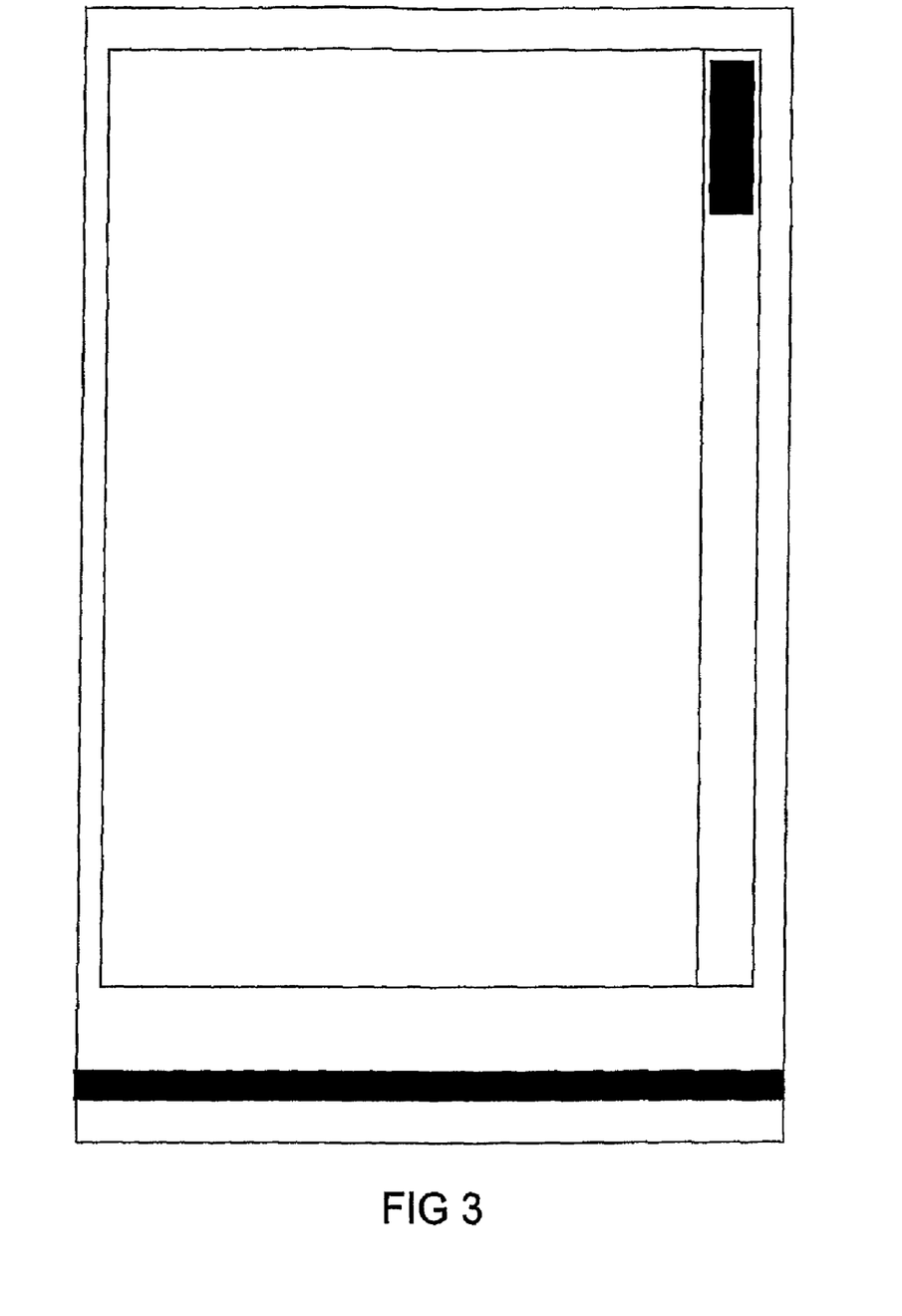
FIG. 3 illustrates a handheld device, in accordance with various embodiments of the present invention.

FIG. 2 illustrates a handheld device 106, in accordance with various embodiments of the present invention. The handheld device 106 comprises a Graphic User Interface (GUI) 202, a key pad 204, scroll 206, and a magnetic card reader 208. The GUI 202 is capable of displaying content such as text, images and videos. The content that is displayed may be the menu of the restaurant, picture of food items in the menu, advertisements and special offers among others. The scroll 206 is used to scroll through the content displayed in GUI 202. The keypad 204 facilitates the customer to provide alphanumerical values whenever necessary. The magnetic card reader 208 facilitates the customer in making payments through smart cards, debit card and credit card. In an embodiment of the present invention, the handheld device may not have a magnetic card reader. In an embodiment of the present invention, the handheld device 106 may be touch screen enabled device as shown in FIG. 3.

Figure 4:
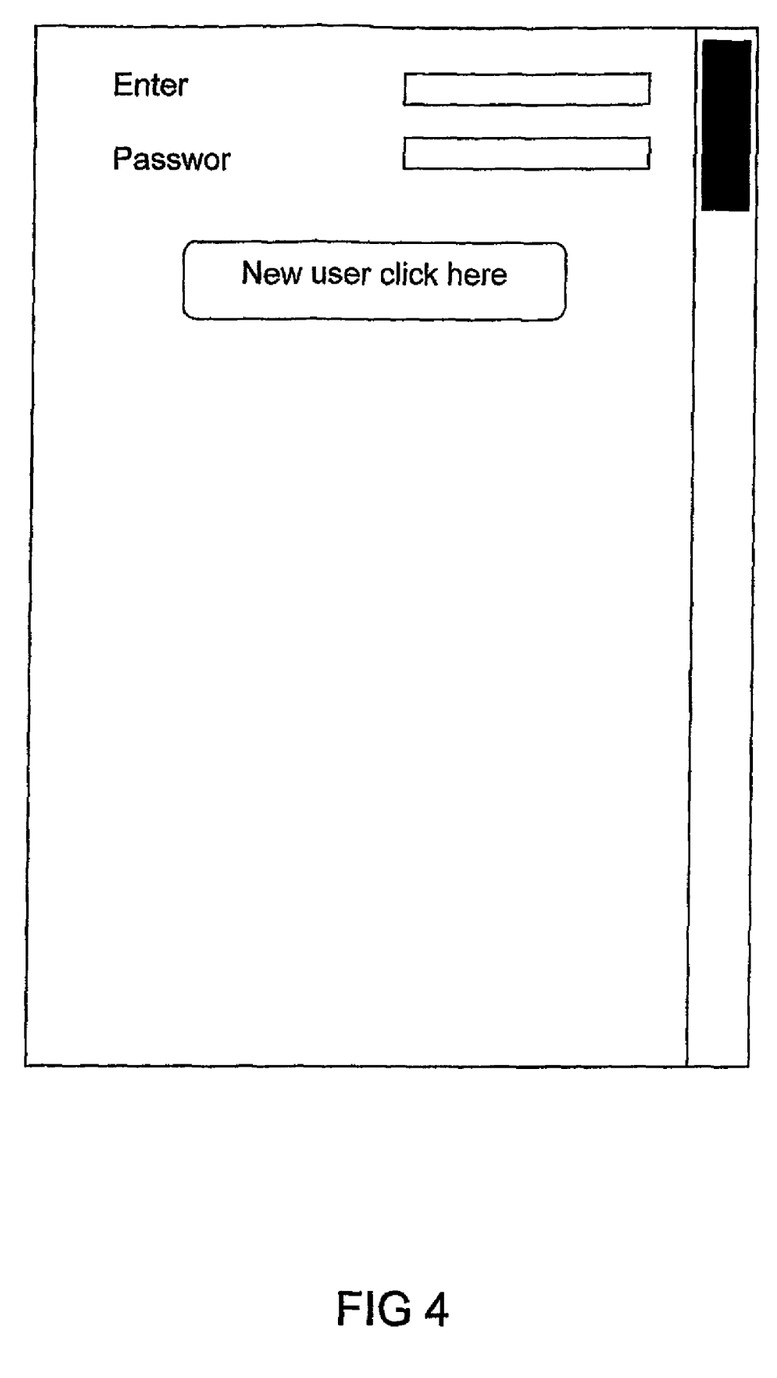
FIG. 4 illustrates a graphic user interface of a handheld device, in accordance with various embodiments of the present invention.

In an embodiment of the present invention, the IBA 102 facilitates consumers to create an account. The account may be created by providing details such as name of the customer, residential address, office address, electronic mailing address, and mobile number. The customer gets a user name and password when he creates an account. After creating the account, the customer may log into the IBA 102 using the username and password by entering their credentials in the text box in the GUI as shown in FIG. 4. The restaurant owners may log into the IBA 102 using login credentials assigned to them. In an embodiment of the present invention, if a restaurant owner chooses to change the menu of his restaurant, he may do so by logging into the internet based application 102. After logging in, he may do the necessary changes using the IBA 102. These changes will be updated in the local server 104a with which the restaurant owner associates. If the restaurant owner has branches of restaurants, the changes will be updated in the local server 104a associated with the particular branch of restaurant. Alternatively, if restaurant owner desires to make different changes in different branches of restaurant, he may do so by using the options provided in the IBA 102.

In an embodiment of the present invention, the customer may login to the IBA 102 using his username and password. Later, he may check the table availability in one or more restaurant and book a table if he desires to. In an embodiment of the present invention, the customer may access the menu of a restaurant and place an order even before visiting the restaurant. Alternatively, the customer may place an order and request it to be home delivered. In an embodiment of the present invention, the availability of table in the restaurants gets updated in real time.

Figure 5:
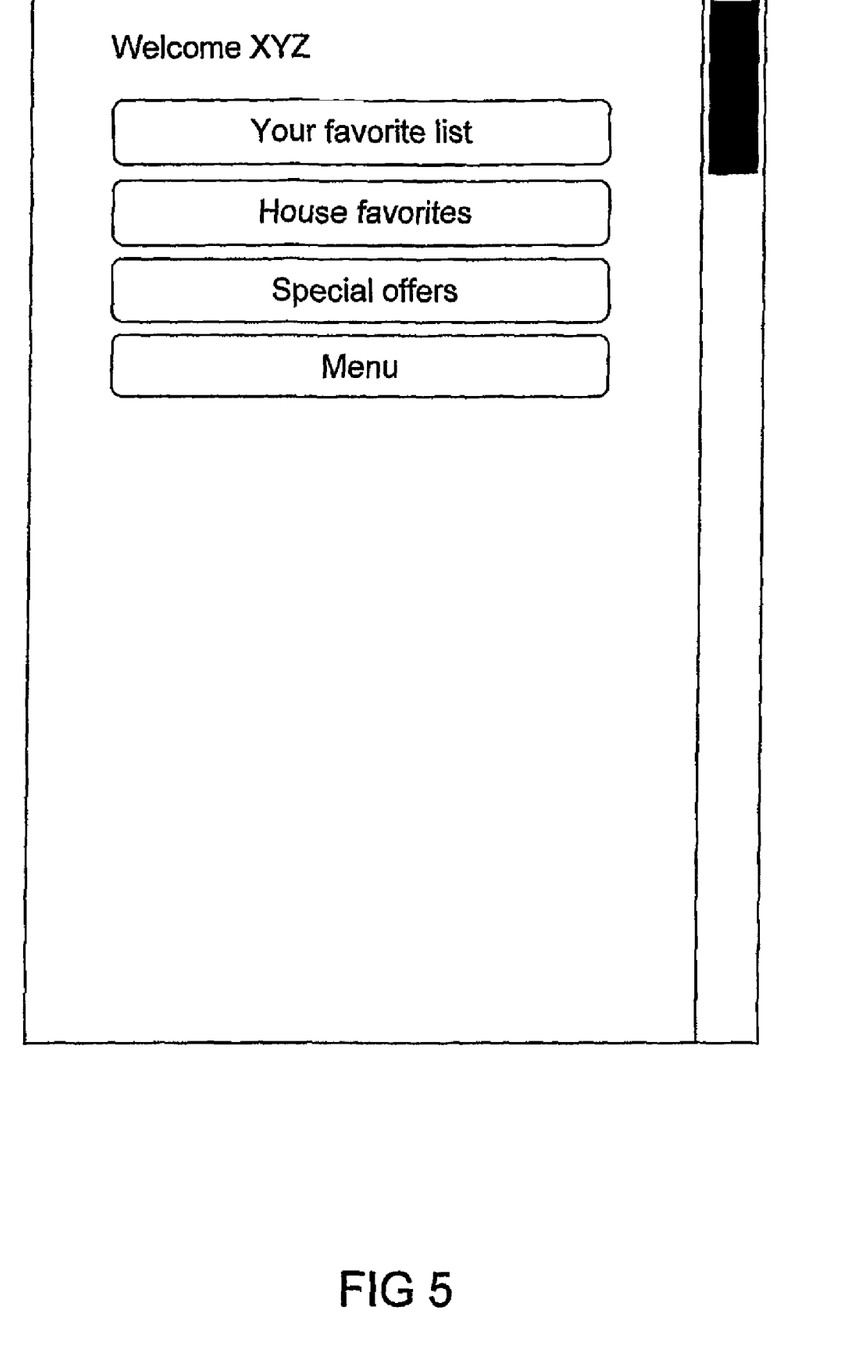
FIG. 5 illustrates a graphic user interface of a handheld device, in accordance with various embodiments of the present invention.
Figure 6:
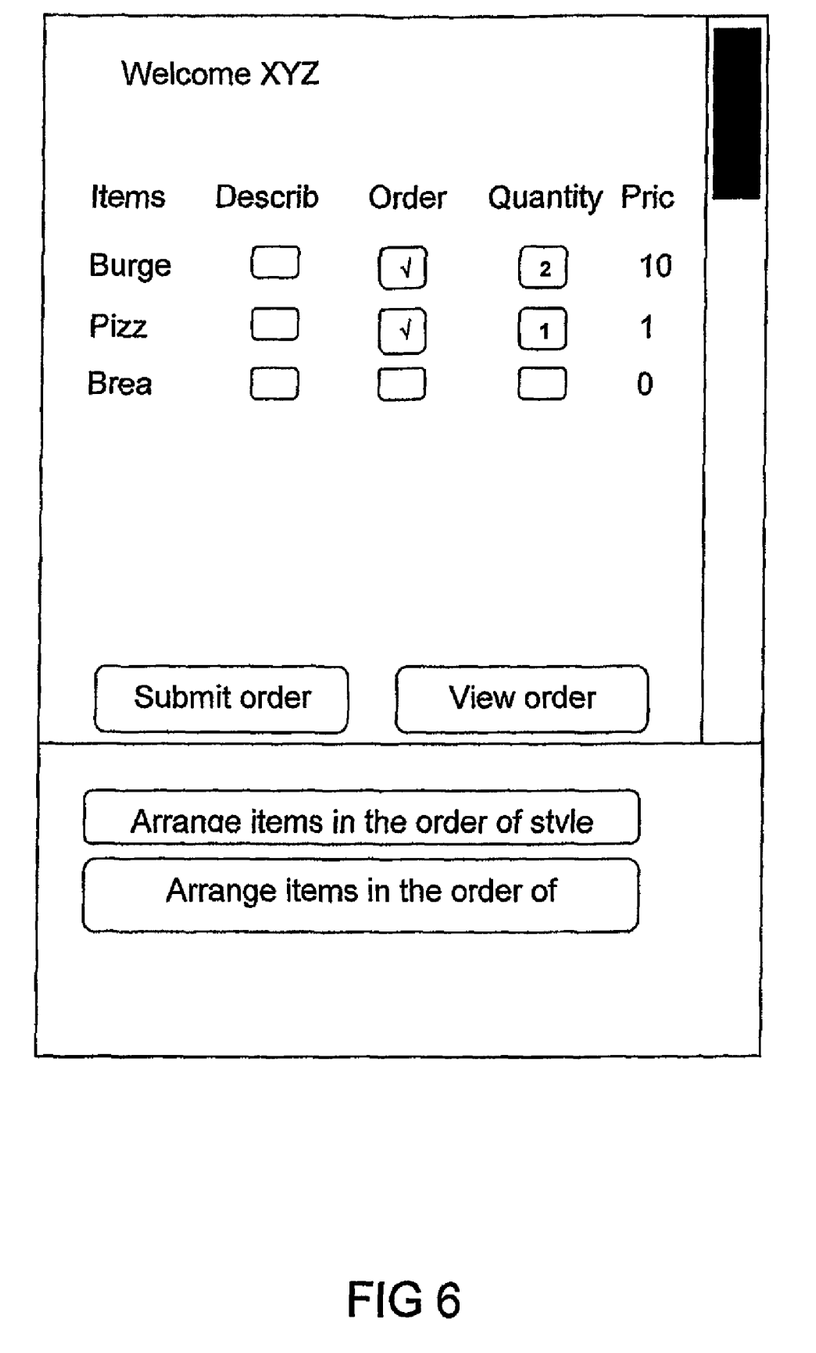
FIG. 6 illustrates a graphic user interface of a handheld device, in accordance with various embodiments of the present invention.

In an embodiment of the present invention, a customer tries to log into the IBA 102 using his authentication credentials. The IBA 102 verifies the authentication credentials, if the authentication credentials are wrong; the customer is requested to provide correct authentication credentials. However, if the authentication credentials are correct, the customer is provided with a list of restaurants which he may visit. The customer may click on a restaurant which he desires to visit. Later, the customer may check the availability of table in the restaurant and book a table if the table is available. The customer checks the availability of the table by providing details such as number of people visiting the restaurant, date and time of visiting, and table where smoking is allowed or not. In an embodiment of the present invention, the customer may be provided with the menu which the restaurant offers when he clicks on the restaurant. The customer may book a table in the restaurant if the availability of the table suits his requirement. Later, the customer may visit the restaurant and occupy the table which he had booked. The customer will be given a handheld device. The customer is asked to enter his authentication credentials. The handheld device transmits the authentication credentials to the local server associated with the restaurant. The local server in turn transmits the authentication credentials to IBA for verification. The IBA verifies the authentication credentials and permission is granted to the customer to login to the handheld device if the authentication credentials are correct. Subsequently, in an embodiment of the present invention the customer is presented with a screen in the handheld device as shown in FIG. 5, which has links to "Your favorite list", "House favorites", "Special offers", and "Menu" among others. In an embodiment of the present invention if the customer clicks on the "Menu" link, he will be directed to a screen as shown in FIG. 6. The screen displays the items which the restaurant offers along with, a link to description for each item, a link for ordering the item, space for specifying the quantity required and the price for each item. In an embodiment of the present invention, the customer may tick the items that he desires to order along with the quantity required. Later the customer may click on "View order" link to have a look at the items that he has ordered and then he may change the order or submit the order by clicking on the submit order link. Alternatively, the user may just click on the "Submit order" link to place the order without clicking on the "View order" link. After submitting the order, the handheld device sends the order to the local server. The local server sends the order to respective devices. In an embodiment of the present invention, the respective devices may be an administration device that takes care of accounting, and a device placed in the kitchen that the chefs may access to prepare the ordered items. Later, the customer may request for a bill through the handheld device. The electronic bill will be sent to the customer through the handheld device. In an embodiment of the present invention, the customer may pay the bill by swiping his magnetic card such as a debit card or a credit card in the magnetic card reader that is provided in the handheld device.

In an embodiment of the present invention, a customer is presented with the screen as shown in FIG. 6. The customer may click on the describe button that will direct him to a page that describes the respective item. In an embodiment of the present invention, images of the item may be displayed to the customer.

In an embodiment of the present invention, when a customer enters a restaurant. He will be given a table if a table is available. However, if the table is not available, he will have to wait in the waiting room. The customer will be given the handheld device, using which the user may place the order even before he is given a table.

In an embodiment of the present invention, if a customer who visits the restaurant has not registered with the IBA 102, he may create an account using the handheld device. The customer may have to enter details, such as name of the customer, residential address, office address, electronic mailing address, and mobile number among others.

In an embodiment of the present invention, the handheld device may be accessed by a customer without entering authentication credentials.

In an embodiment of the present invention, the handheld device may be used in a restaurant to which the handheld device is associated with. When the handheld device is operated, the handheld device is authenticated by the local server that is associated with the restaurant. Hence, if a customer steels the handheld device and tries to use it in a different restaurant, he will not be able to use it, as authentication of the device will fail.

In an embodiment of the present invention, a customer may provide feedback on the food that he had in the restaurant using the handheld device. The customer may also provide a rating for the food. Additionally, the customer may mark the food that he likes as his favorites using the handheld device. Subsequently, these food items will be included in the favorite list of the customer. The favorite list is transmitted from the handheld device to the local server of the restaurant, which in turn will be transmitted to the IBA 102. The IBA 102 stores this information in a database. Thereby, when the customer visits the restaurant again, the customer may directly order from the favorite list by clicking on "Favorite list", after he logs into the handheld device using his authentication credentials.

In an embodiment of the present invention, information related to the transaction made by the customer is sent to IBA 102 by the local server of the restaurant. The information may comprise one or more of name of the customer, customer ID (based on the customer's login credentials), number of people who visited along with the customer, the items that the customer ordered, the total bill, the favorite list of the customer and time of visit among others. The IBA 102 is capable of collating this data and generating a management information report for the restaurant owners. The management information report helps the restaurant owner know at what frequency a customer visits his restaurant, the average bill that the customer pays, and the food item that is most preferred by the customers of his restaurant and so on.

In an embodiment of the present invention, the customer may use the handheld device 106 to make online reservations. The reservations may be for movie tickets and travel tickets among others. In an embodiment of the present invention, the customer may check the status of his reservations and may also cancel the reservations using the handheld device 106. In an embodiment of the present invention, the customer may download content using the handheld device 106. The content that is downloaded may be one or more of audio, video and images among others. In an embodiment of the present invention, the handheld device 106 provides interactive advertisements to the customers. The customer may view the interactive advertisements and may interact with the same by clicking, ordering and tracking the status of the interactive advertisements. In an embodiment of the present invention, the user may also provide feedback and rate the interactive advertisements provided to him.

In an embodiment of the present invention, the system facilitates a customer to place orders from a place other than within the restaurant, such as an office. The customer accesses a handheld device in the office, wherein the handheld device communicates with a local server. The local server in turn communicates with the server where IBA 102 is deployed. The handheld device is capable of downloading menus of various restaurants. The customer may browse through the same and place orders accordingly.

Figure 7:
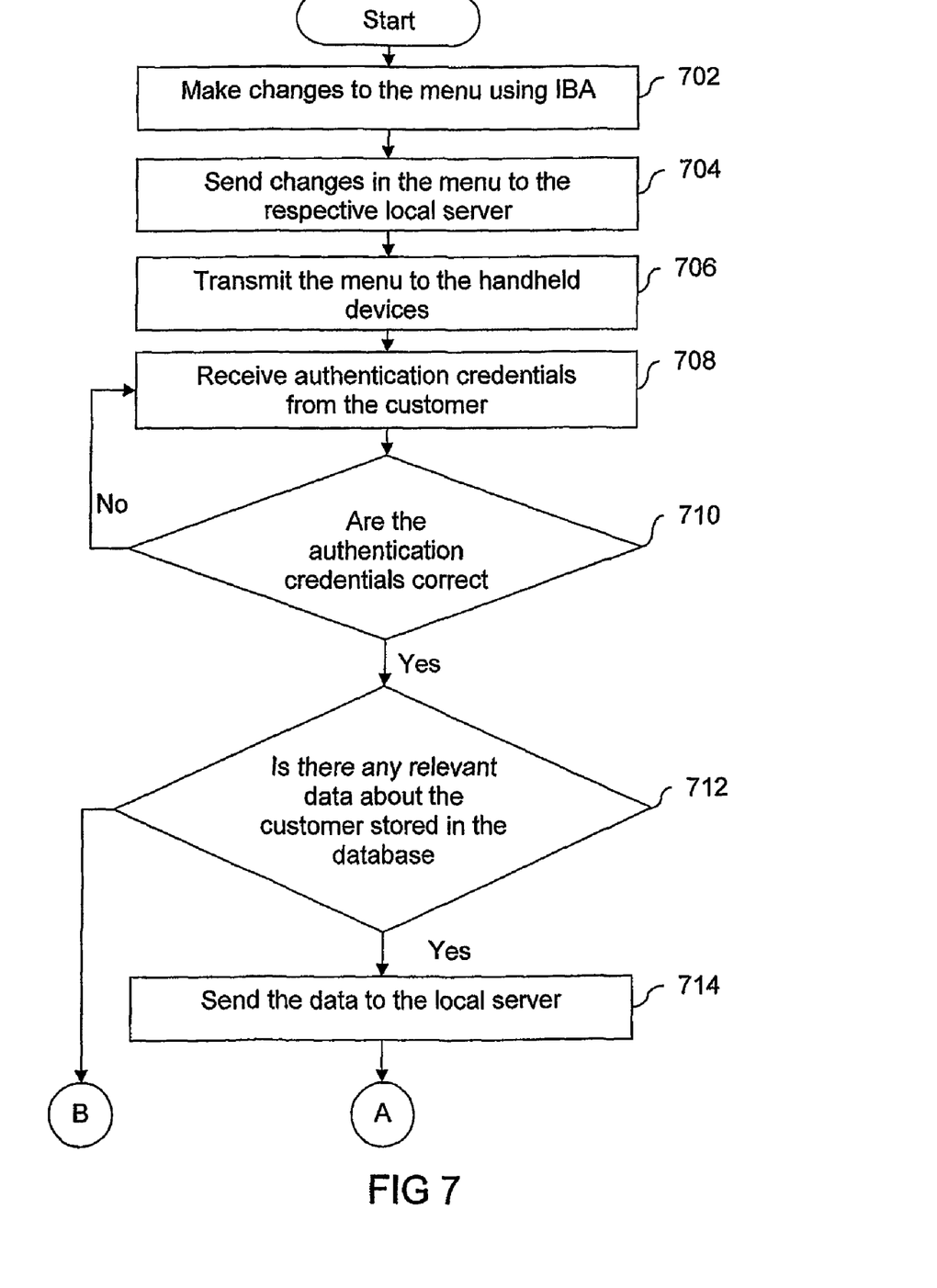
FIG. 7 is a flow chart of actions performed by a customer and the actions performed at the local server, in accordance with various embodiments of the present invention.
Figure 7A:
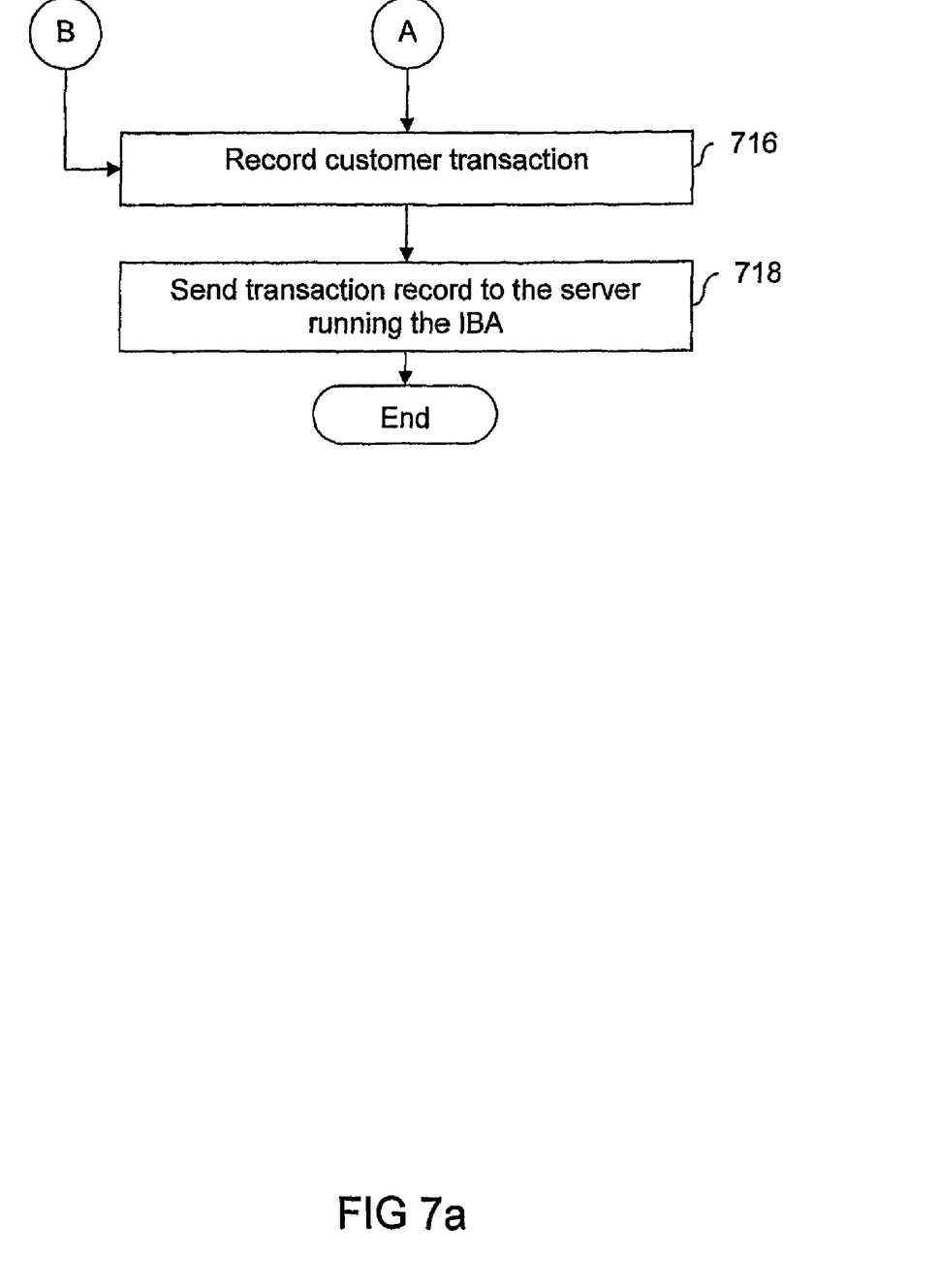

FIGS. 7 and 7a is a flow chart of a method for managing restaurants, in accordance with various embodiments of the present invention. A restaurant owner logs into the IBA 102 using his login credentials. After logging in, at step 702, the restaurant owner may make changes in the menu using the IBA 102. Later at step 704, the server over which the IBA 102 is deployed sends the menu to the local server with which the restaurant owner is associated. The local server transmits the menu to the handheld devices at step 706. In an embodiment of the present invention, a customer to access the menu in the handheld device needs to enter his authentication credentials. At step 708, the customer enters his authentication credentials in the handheld device. The credentials are transmitted to the local server over which IBA 102 is deployed for authentication. The credentials are checked by the IBA 102 at step 710. If the credentials provided by the customer are correct, at step 712 the IBA 102 checks if any relevant data relating to the customer is stored in the database. In an embodiment of the present invention, relevant information may be a list of favorite items of the customer, frequency at which the customer visits the restaurant and special offers to be given to the customer. If there is any relevant data pertaining to the customer, than the same is transmitted to the local server of the restaurant at step 714. The customer accesses the handheld device and may carry out transactions. In an embodiment of the present invention, the transaction may be placing an order using the handheld device. The local server records the transaction at step 716. Later, the local server sends the transaction record to the server over which the IBA 102 is deployed. The IBS 102 stores the transaction in a database.

Figure 8:
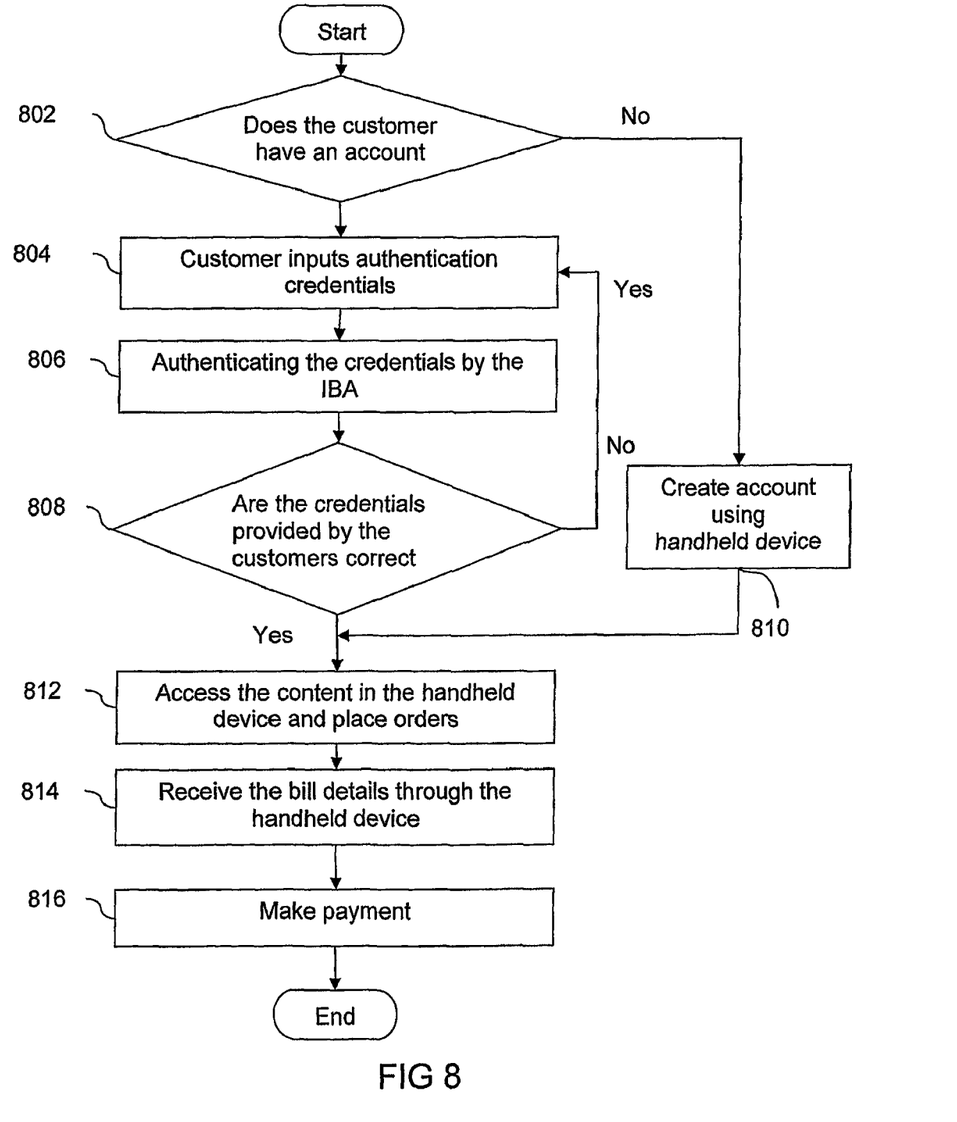
FIG. 8 is a flowchart of a method for placing order by a customer, in accordance with various embodiments of the present invention.

FIG. 8 is a flowchart of a method for placing order by a customer, in accordance with various embodiments of the present invention. A customer is given one of the handheld devices 106a, he is asked to provide his authentication credentials in order to access the features provided by the system. If the customer does not have an account, he may create the same using the handheld device 106a at step 810. However, if the customer has an account, he may inputs his authentication credentials in the handheld device 106a at step 804. The handheld device 106a transmits the authentication details to the local server 104a. The local server 104a sends the authentication credentials to the server over which IBA 102 is deployed. The IBA 102 checks the authentication credentials at step 806. If, the authentication credentials are wrong, the customer is requested to provide correct authentication credentials. However, if the authentication credentials are correct, the IBA 102 sends the customer information to the local server 104a. In an embodiment of the present invention, the customer information may include the favorite items of the customer, special offers to be given to the customer, account balance of the customer, if the customer has a prepaid account. Later, at step 812, the customer may access the handheld device 106a make transactions, such as, placing an order and accessing advertisements through the handheld device 106a among others. The local server 104a records the transaction and bills the customer accordingly at step 814. The customer may pay the bill at step 816 by swiping his credit or debit card in the magnetic card reader provided in the handheld device. Alternatively, he may pay the bill by cash.

In an embodiment of the present invention, the customer logs into the IBA 102 using his authentication credentials. He credits a certain amount into his account by providing his credit card details to the IBA 102. When the customer visits a restaurant which associates with the IBA 102, the bill amount will be debited from this previously credited account.

In an embodiment of the present invention, a restaurant owner may login to the IBA 102 using his credentials. Later, the restaurant owner may make some changes in the menu. The changes made by the restaurant owner will be sent to the local server of the restaurant. Subsequently, when a customer accesses the handheld device of the restaurant, he will be presented with the changed menu. In an embodiment of the present invention, if the restaurant owner has more than one branch of restaurant, he can make the changes that are required and the same will be sent to the local servers of the different branches of restaurants. In an embodiment of the present invention, the restaurant owner may access the management information report that is generated by the IBA 102.

In an embodiment of the present invention, the handheld device may have a bar code reader. The handheld device may be used in a retail store. A customer may be given a given a handheld device when he enters the retail store. The customer uses the handheld device to read the bar codes of the items that he intends to purchase. The handheld device shows the bill for the items whose bar codes have been read using the handheld device. Later the handheld device is given to a clerk who will collect all the items whose bar codes were read and delivers the same to the customer.

What is claimed is:

1. A system for managing restaurants, the system facilitating an owner or a manager of at least one restaurant in managing restaurant business and facilitating customers of the restaurant in at least placing orders, the system comprising:
    a local server, the local server being associated with the restaurant;
    a plurality of hand held devices for customers, each of said hand held devices configured to facilitate a respective customer of the restaurant to place orders by communicating with the local server; and
    an internet based application, the internet based application being deployed on a server, the internet based application configured to send data to the local server and receive data from the local server.

2. The system according to claim 1, wherein the handheld device comprises:
    a graphic user interface capable of displaying at least one of text, image and video.

3. The system according to claim 2, wherein the handheld device further comprises a magnetic card reader that facilitates the customer to make payment using their magnetic card.

4. The system according to claim 1, wherein the handheld device comprises a transceiver to facilitate communication of data with the local server.

5. The system according to claim 1, wherein the internet based application comprises a database, the data received from the local server is arranged in the database.

6. A method for managing restaurants using a system, the method facilitates an owner or a manager of at least one restaurant the in managing restaurant business and facilitates customers of the restaurant in at least placing orders, the system comprising an internet based application, at least one local server and at least one handheld device for a customer, the internet based application being deployed on a server for sending and receiving data to and from the local server, the local server and the handheld device configured to communicate data with each other and with the internet based application, the handheld device being configured to display content at least a menu and a brief description of a dish to the customer and receiving input from the customer, the method comprising:
    transmitting a menu of the restaurant to a local server of the restaurant, wherein the menu is sent from the internet based application to the local server;
    authenticating said handheld device for the customer by the local server;
    transmitting the menu to the handheld device, the menu is transmitted from the local server to the handheld device; and
    placing an order by the customer by providing inputs to the handheld device.

7. The method according to claim 6, further comprising the step of uploading a menu in the internet based application by the restaurant owner.

8. The method according to claim 6, further comprising the step of making changes in the menu using the internet based application.

9. The method according to claim 6, further comprising inputting authentication credentials by the customer in the authenticated handheld device before placing the order.

10. The method according to claim 9 further comprising:
    storing the items marked by the customer in a database; and
    sending a list of the items marked by the customer to the internet based application.

11. The method according to claim 10, further comprising the step of placing an order from the one or more items in the menu marked as favorites.

12. The method according to claim 6 further comprising recording the customers transaction by the local server.

13. The method according to claim 12 further comprising sending the recorded transaction to the internet based application, wherein the recorded message is sent by the local server.

14. The method according to claim 6 further comprising marking one or more items in the menu as favorites by the customer.

15. The method according to claim 14 further comprising:

storing the items marked by the customer in the database; and sendinga list of the items marked by the customer to the internet based application.

16. The method according to claim 6, further comprising the step of placing an order from the one or more items in the menu marked as favorites.

17. The method according to claim 6, further comprising the step of providing at least one of feedback and rating for items in the menu.

18. The method according to claim 17, further comprising the step of viewing at least one of feedback and rating provided by other users for items in the menu.

19. The method according to claim 6, further comprising the step of viewing at least one of feedback and rating provided by other users for items in the menu.

20. The method according to claim 6, further comprising the step of downloading content by the customer using the handheld device, wherein the content is one or more of text, audio, video and images.

21. The method according to claim 6, further comprising the step of providing interactive advertisements to the customer through the handheld device.

22. The method according to claim 21, further comprising the step of interacting with the interactive advertisements using the handheld device.

23. The method according to claim 22, further comprising the step of providing one or more feedback and rating for the interactive advertisements.

24. The method according to claim 6, further comprising the steps of:

accessing menu of plurality of restaurants using the handheld device; and placing the order using the handheld device.

25. The system according to claim 1 wherein said handheld devices are authenticated handheld device authenticated by said local server.

26. The system according to claim 25 wherein at least one of the authenticated handheld devices is configured to receive customer authentication credentials from the customer and send the authentication credentials to the internet based application for verification.

* * * * *